United States Patent
Statz et al.

(10) Patent No.: US 6,743,838 B2
(45) Date of Patent: Jun. 1, 2004

(54) EXPOXY FUNCTIONALIZED ETHYLENE COPOLYMER ASPHALT REACTION PRODUCTS

(75) Inventors: Robert Joseph Statz, Kennett Square, PA (US); Elizabeth R. Griffin, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 7 days.

(21) Appl. No.: 10/188,171

(22) Filed: Jul. 1, 2002

(65) Prior Publication Data

US 2003/0087997 A1 May 8, 2003

Related U.S. Application Data

(60) Provisional application No. 60/302,147, filed on Jun. 29, 2001.

(51) Int. Cl.[7] .................................. C08L 95/00
(52) U.S. Cl. ........................ 523/450; 524/59; 524/68; 524/69; 525/54.5
(58) Field of Search ........................ 523/450; 524/59, 524/68, 69; 525/54.5

(56) References Cited

U.S. PATENT DOCUMENTS

| | | |
|---|---|---|
| 3,202,621 A | 8/1965 | Street |
| 4,451,598 A | 5/1984 | Decroix |
| 4,650,820 A | 3/1987 | Decroix |
| 5,070,123 A | 12/1991 | Moran |
| 5,095,055 A | 3/1992 | Moran |
| 5,306,750 A | 4/1994 | Goodrich et al. |
| 5,556,900 A | 9/1996 | Goodrich et al. |
| 6,011,095 A | 1/2000 | Planche et al. |
| 6,117,926 A | 9/2000 | Engber et al. |
| 6,136,898 A | 10/2000 | Loza et al. |
| 6,399,680 B1 | 6/2002 | Engber et al. |
| 6,414,056 B1 | 7/2002 | Puzic et al. |

FOREIGN PATENT DOCUMENTS

| | | |
|---|---|---|
| JP | 6116333 A | 4/1994 |
| WO | WO 91/09907 | 7/1991 |

OTHER PUBLICATIONS

PCT International Search Report for International application No. PCT/US02/22290.

*Primary Examiner*—Philip Tucker
*Assistant Examiner*—D. E. Aylward

(57) ABSTRACT

The present invention relates to polyepoxy-polymer-linked-asphalt having enhanced properties made by reacting a glycidyl-functionalized ethylene copolymer with reactive asphalt, wherein the glycidyl-functionalized ethylene copolymer has a glycidyl-containing comonomer content of 5 weight percent or less and relatively high number average molecular weight characterized by a melt index of 4 grams/10 minutes or less measured in accord with ASTM D1238-65T, Condition E.

7 Claims, No Drawings ically useful
EXPOXY FUNCTIONALIZED ETHYLENE COPOLYMER ASPHALT REACTION PRODUCTS This application claims the benefit of U.S. Provisional Application No. 60/302,147, filed Jun. 29, 2001.

BACKGROUND OF THE INVENTION

1. Field of the Invention

This invention relates to a thermoplastic polymer alloy with asphalt that is useful in the road paving and roofing industries. More particularly, this invention relates to the reaction and resultant linking of epoxide-containing polymers to asphalt forming a polyepoxy-polymer-linked-asphalt composition having improved high temperature resistance, improved high elasticity at ambient and low temperatures as well as good toughness and tenacity values.

2. Description of Related Art

The use of polymers as additives to asphalt (bitumen) is well known in the art. See for example U.S. Pat. Nos. 4,650,820 and 4,451,598, both incorporated herein by reference, wherein terpolymers derived from ethylene, an alkyl acrylate and maleic anhydride are mixed with bitumen. Also, see for example U.S. Pat. Nos. 5,306,750 and 6,117,926, both incorporated by reference, wherein reactant epoxy-functionalized, particularly glycidyl-containing, ethylene terpolymers are mixed and reacted with bitumen and, preferably (as taught in U.S. Pat. No. 6,117,926) with a catalyst to accelerate the rate of reaction and lower cost of the modified system.

Today's asphalt pavements require good resistance to high temperatures coupled with good low temperature properties as defined by SHRP values. In addition, elastomeric properties are desired by Departments of Transportation (DOT's) to give resistance to low temperature cracking, to fatigue and to rutting. These elastomeric properties are defined by ductility at room and low temperature, elastic recovery, toughness and tenacity. Particularly useful polymer-modified asphalts generally meeting these requirements are the polyepoxy-polymer-linked-asphalts that are made by a process described in U.S. Pat. No. 5,306,750 patent to J. L. Goodrich and R. J. Statz. The reaction described in U.S. Pat. No. 5,306,750 can be enhanced as provided in U.S. Pat. No. 6,117,926 patent to Engber.

While it is possible to produce particularly useful polymer-modified asphalt using the processes described in U.S. Pat. Nos. 5,306,750 and 6,117,926, there is still a need for polymer-modified asphalt with improved high temperature resistance as well as improved elasticity at both ambient and low temperatures. There is also a need to provide polymer-modified asphalt that has good toughness and tenacity. Further, polymer-modified asphalt reaction products with relatively low viscosities (low enough to allow easy application) at application temperatures (about 140° C.), high ring and ball softening points (greater than 75° C., preferably greater than 100° C.) and a high degree of elasticity (greater than 75% after 300% stretch) are desired.

It is also desirable to be able to meet comparable SHRP standards while employing glycidyl-moiety-containing-ethylene copolymers having lower glycidyl moiety content than typically employed to get the SHRP values, thus reducing the cost of the polyepoxy-polymer-linked-asphalts.

BRIEF SUMMARY OF THE INVENTION

This invention provides a polymer-modified asphalt composition that meets the above-identified needs. In particular, this invention provides for a polyepoxy-polymer-linked-asphalt composition (particularly for use in paving applications) preferably having a. enhanced stability (minimum loss of viscosity at ambient temperature after storage at elevated temperature), b. significantly higher tenacity without loss of toughness and preferably with an increase in toughness (tenacities are preferably greater than 50 inch-pounds, more preferably greater than 75 inch-pounds, measured in accord with ASTM D5801 while maintaining toughness at greater than 75 inch-pounds, preferably increasing it to greater than 110 inch-pounds);

c. a low-temperature ductility of at least 7 centimeters, measured in accord with ASTM D113 at 4° C.

It also provides a polyepoxy-polymer-linked-asphalt composition (particularly for use in roofing applications) having a. an elastic recovery of greater than 70% (preferably greater than 80%) measured in accord with ASTM D 6152, Roofing Section 7.5, and b. Ring and Ball Softening Points of greater than 75° C. (preferably greater than 100° C.) measured in accord with ASTM D3461. The polyepoxy-polymer-linked-asphalt composition comprises:

a. about 90 to about 99.5 weight percent (wt. %), based on total of component a and component b, asphalt; and b. about 0.5 to about 10 wt. %, based on total of component a and component b, epoxy-functionalized ethylene copolymer, preferably containing a softening comonomer such as an alkyl acrylate, having a melt index of 4 grams/10 minutes or less measured in accord with ASTM D1238-65T, Condition E.

The polyepoxy-polymer-linked-asphalt composition may optionally further contain a functionalized polyolefin that is reactive with the asphalt and the epoxy-functionalized ethylene copolymer. When the functional polyolefin is included, the polyepoxy-polymer-linked-asphalt composition preferably comprises:

a. about 87 to about 99 wt. %, based on total of components a, b, and c, asphalt; and b. about 0.5 to about 10 wt. %, based on total of components a, b, and c, epoxy-functionalized ethylene copolymer, preferably containing a softening comonomer such as an alkyl acrylate, having a melt index of 4 grams/10 minutes or less measured in accord with ASTM D1238-65T, Condition E; and c. about 0.5 to about 3 wt. %, based on total of components a, b, and c, reactive functionalized polyolefin.

Preferably, the optional functionalized polyolefin is an anhydride-functionalized, particularly maleic-anhydride-grafted polyethylene, particularly polyethylene with a density of more than 0.94. Useful polyethylene may be selected from high-density polyethylene, low density polyethylene or linear low density polyethylene and may be made by any process known in the art, including low and high pressure processes using traditional catalyst as well as newer early and late transition metal catalysts. Preferable functionalized polyolefins useful in the present invention are those described in U.S. Pat. Nos. 4,650,820 and 4,451,598.

Preferably, the epoxy-functionalized ethylene copolymer is an ethylene glycidyl acrylate or ethylene glycidyl methacrylate copolymer, more preferably an ethylene, alkyl acrylate, glycidyl acrylate or glycidyl methacrylate terpolymer, wherein the copolymer has a melt flow index (as determined by ASTM D1238-65T, Condition E) of about 4 grams/10 minutes or less, preferably about 0.3 to about 4 grams/10 minutes, and more preferably about 0.3 to about 3 grams/10 minutes or to about 2 grams/10 minutes. Preferably, the comonomer containing the glycidyl moiety (e.g., glycidyl acrylate or glycidyl methacrylate) is about 0.3

(or about 0.5) wt. % to about 3 (or about 4 or about 5) wt. % and the alkyl acrylate is 0 to about 40 (preferably about 20 to about 40 or about 25 to about 35) wt. % of the total weight of the epoxy-functionalized ethylene copolymer.

Further, non-reactive diluent polymers known in the art may be included in the polyepoxy-polymer-linked-asphalt composition. Preferably, such polymers include ethylene acrylate or vinyl acetate copolymers, styrene polybutadiene or isoprene, ethylene butene block copolymers (e.g., SBS, SIS, SEBS block copolymers) or polyolefins produced with transition metal catalysts.

The polyepoxy-polymer-linked-asphalt composition of the present invention may be made in accord with the process described in U.S. Pat. No. 5,306,750 and particularly with the process described in U.S. Pat. No. 6,117,926. Preferably, the polyepoxy-polymer-linked-asphalt composition is made by melt-mixing the asphalt, the epoxy-functionalized ethylene copolymer, and optionally the functionalized polyolefin first and then continuing to mix in the presence of a catalytic materials such as polyphosphoric acid, phosphoric acid anhydride and/or titanates.

DETAILED DESCRIPTION

As summarized above, the present invention relates to a polyepoxy-polymer-linked-asphalt composition comprising about 90 to about 99.5 weight percent (wt. %) Reactant Asphalt, preferably as described below, reacted with about 0.5 to about 10 wt. % Epoxy-Functionalized Ethylene Copolymer, preferably as described below (wt. % based on total of Reactant Asphalt and Epoxy-Functionalized Ethylene Copolymer). Optionally, the invention relates to a polyepoxy-polymer-linked-asphalt composition comprising about 87 to about 99 wt. % Reactant Asphalt, preferably as described below, reacted with about 0.5 to about 10 wt. % Epoxy-Functionalized Ethylene Copolymer, preferably as described below, and about 0.5 to about 3 wt. % Functionalized Polyolefin reacted with the Reactant Asphalt and the Epoxy-Functionalized Ethylene Copolymer (wt. % based on total of Reactant Asphalt, Epoxy-Functionalized Ethylene Copolymer, and Functionalized Polyolefin). The Functionalized Polyolefin is preferably as described below. The invention further relates to the above polyepoxy-polymer-linked-asphalt compositions modified by the addition of Non-Reactive Polymers, preferably as described below.

Reactant Asphalt

All types of asphalts (bitumens) are useful in this invention whether they be natural or synthetic. Representative sources for asphalts include: native rock, lake asphalts, petroleum asphalts, airblown asphalts, cracked or residual asphalts. Asphalts can be used containing a wide range of asphaltenes including asphalts containing more than 7 weight percent asphaltenes and typically more than 10 weight percent asphaltenes. Generally, the asphalts useful in this invention will contain less than 5 weight percent oxygen compounds and frequently less than 1 weight percent oxygen compounds. Also, the asphalts useful in this invention will be soluble in organic solvents commonly used to dissolve asphalt.

Preferred asphalts have a viscosity at 60° C. of 100 to 20,000 poise, preferably 200 to 10,000, more preferably 300 to 4000, and still more preferably 400 to 1500 poise.

Epoxy-Functionalized Ethylene Copolymer

The Epoxy-Functionalized Ethylene Copolymer useful in the present invention will have a melt flow index as determined by ASTM D1238-65T, Condition E, of about 4 grams/10 minutes of less, preferably about 0.3 to about 4 grams/10 minutes, and more preferably about 0.3 to about 3 grams/10 minutes or to about 2 grams/10 minutes. Preferably, the Epoxy-Functionalized Ethylene The preferred Epoxy-Functionalized Ethylene Copolymer useful in the present invention are glycidyl-containing polymers. Glycidyl-containing ethylene copolymers and modified copolymers useful in the present invention are well known in the polymer art and can readily be produced by the concurrent reaction of monomers in accordance with U.S. Pat. No. 4,070,532, the entire disclosure of which is incorporated herein by reference.

Generally useful ethylene glycidyl-containing, epoxy-functionalized ethylene copolymers will contain about 0.3 (or about 0.5) to about 3 (or about 4 wt. % or about 5 wt. %) comonomer containing glycidyl moieties based on the total weight of the epoxy-functionalized ethylene copolymer. The glycidyl moiety may be represented by the following formula:

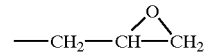

Preferred epoxy-functionalized ethylene copolymers useful in this invention may be represented by the formula: E/X/Y, where E is the copolymer unit —($CH_2CH_2$)— derived from ethylene; X is the copolymer unit —($CH_2CR_1R_2$)—, where $R_1$ is hydrogen, methyl, or ethyl, and $R_2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —($CH_2CR_3R_4$)—, where $R_3$ is hydrogen or methyl and R4 is carboglycidoxy or glycidoxy (Y for example is derived from glycidyl acrylate or glycidyl methacrylate). For purposes of this invention the epoxy-containing comonomer unit, Y, may also be derived from vinyl ethers of 1 to 10 carbon atoms (e.g., glycidyl vinyl ether) or mono-epoxy substituted di-olefins of 4 to 12 carbon. The R4 in the above formula includes an internal glycidyl moiety associated with a cycloalkyl monoxide structure; e.g., Y derived from vinyl cyclohexane monoxide. Preferably, X is a $C_{1-10}$ alkyl acrylate, particularly iso-butyl acrylate, n-butyl acrylate, iso-octyl acrylate, or methyl acrylate. Preferably, Y is selected from glycidyl acrylate or glycidyl methacrylate.

For this preferred embodiment, useful wt. %'s (based on total weight of E, X, and Y in the copolymer) of the E/X/Y epoxy-functionalized ethylene copolymer units preferably are 0 to about 40 (preferably about 20 to about 40 or about 25 to about 35) wt. % X, about 0.3 (or about 0.5) to about 3 (or about 4 or about 5) wt. % Y, and the remainder E. It is also preferred that the epoxy-containing monomers, are incorporated into the epoxy-functionalized ethylene copolymer by the concurrent reaction of monomers (direct polymerization) and not by grafting onto the reactant polymer by graft polymerization.

Functionalized Polyolefin

Functionalized polyolefins are polyolefins that are co-reactive with the epoxy-functionalized ethylene copolymer and the reactant asphalt. Preferably, they are carboxylic acid anhydride-functionalized, particularly maleic-anhydride-grafted polyethylene. The polyethylene particularly is polyethylene with a density of more than 0.94. Useful polyethylene may be selected from high-density polyethylene, low density polyethylene or linear low density polyethylene and may be made by any process known in the art, including low and high pressure processes using traditional catalyst as well as newer early and late transition metal catalysts. Preferable functionalized polyolefins useful in the present invention are those described in U.S. Pat. Nos. 4,650,820 and 4,451,598.

Non-Reactive Polymers

Non-reactive polymers are polymeric compositions known in the art for inclusion in polymer-modified asphalt that do not react with the asphalt. Preferably, these non-reactive polymers also do not react with the epoxy-functionalized ethylene copolymers or functionalized polyolefins. They are sometimes referred to as "diluent" polymers.

These non-reactive polymers may include ethylene acrylate or vinyl acetate copolymers, styrene polybutadiene or isoprene, ethylene butene block copolymers (e.g., SBS, SIS, SEBS block copolymers) or polyolefins produced by any process known in the art with any known transition metal catalysts.

These non-reactive polymers can be combined into the reactive asphalt, epoxy-functionalized ethylene copolymers and optional functionalized polyolefins so they comprise 0% to 18% of the final polymer-linked-asphalt composition, preferably 0 to 15%, more preferably 0 to 10%.

Process for Making a Polyepoxy-Polymer-Linked-Asphalt Composition

The process for making the polyepoxy-polymer-linked-asphalt compositions of the present invention can be any process well known to those skilled in the art for reacting GMA copolymers with asphalt. Preferably, the process used is that described in U.S. Pat. No. 5,306,750, preferably that more fully described in U.S. Pat. No. 6,117,926.

EXAMPLES

Tests Employed in Examples

Tests employed in the examples are as set forth in Table 1.

TABLE 1

TESTS

| Test | Units | Method/Description |
|---|---|---|
| Melt Flow Index (MI) | Grams/10 min. | ASTM D1238-65T, Condition E |
| Toughness and Tenacity | Inch-pounds | ASTM D5801 |
| Room Temperature Ductility | Centimeters | ASTM D113 at 23° C. |
| Low Temperature Ductility | Centimeters | ASTM D113 at 4° C. |
| SHRP Pass Fail Temperature | ° C. | AASHTO TP5 G*/sin (Δ) > 1.0 kilopascals (kPa) measured at 10 radians/second |
| (Δ) | Degrees | Phase Angle as measured using AASHTO TP5 |
| Ring and Ball Softening Point | ° C. | ASTM D3461 |
| Elastic Recovery | Percent (%) | ASTM D6152, Roofing §7.5 |

Process for Making Road Asphalt in Examples 500 grams of an AC 10 asphalt from Conoco was heated in a can equipped with a stirrer until the asphalt reached a temperature of 190° C. At this point, the glycidyl-containing ethylene copolymers identified in Table 2 were added in the amount necessary to give the percentages of polymer in the asphalt cited in Table 2 and the mixture was allowed to stir at 190° C. for two hours. At this time, when all of the polymer had dissolved, enough polyphosphoric acid was then added to equal 0.2 wt. % of the total of the asphalt and the polymer was added. The product was allowed to stir at 190° C. for 1 additional hour and samples were poured for testing (test results are reported in Table 3).

TABLE 2

ROAD ASPHALT MODIFIERS

| Ex. | GMA Copolymer | % nBA* | % GMA* | MI | Wt. % Polymer in Asphalt. |
|---|---|---|---|---|---|
| 1 | GMA-1 | 30.2 | 2.8 | 2 | 3 |
| 2 | GMA-1 | 30.2 | 2.8 | 2 | 1.5 |
| 3 | GMA-2 | 30.8 | 3.4 | 2.6 | 3 |
| 4 | GMA-2 | 30.8 | 3.4 | 2.6 | 1.5 |
| 5 | GMA-3** | 29.5 | 2.9 | 2.1 | 3 |
| Comp. Examples | | | | | |
| C1 (AC 10) | — | — | — | — | — |
| C2 | GMA-4 | 25.1 | 8.5 | 5.5 | 2 |
| C3 | GMA-5 | 24 | 8.9 | 8.1 | 2 |
| C4 | GMA-6*** | 28 | 5.3 | 12 | 1.5 |
| C5 | GMA-7**** | 24 | 9.0 | 8 | 2 |

*Weight percentages of n-butyl acrylate and glycidyl methacrylate are based on total weight of ethylene/nBA/GMA polymer.
**Mn = 30,146; Mw = 209,624
***Mn = 28,930; Mw = 175,589
****Mn = 21,325; Mw = 220,986

TABLE 3

ROAD ASPHALT PROPERTIES

| Ex. | Toughness | Tenacity | Room Temp. (23° C.) Ductility | Low Temp. (4° C.) Dutility | SHRP Pass Fail Temp. | Phase angle |
|---|---|---|---|---|---|---|
| 1 | 153 | 95 | | 21 | 79.4 | 62 |
| 2 | 116 | 80 | | | 70.2 | 73 |
| 3 | 144 | 90 | | 24 | 80.3 | 59 |
| 4 | 120 | 82 | | | 70.9 | 71 |
| 5 | 181 | 114 | 74 | 19 | 74.6 | 68 |
| Comp. Ex. | | | | | | |
| C1 | — | — | — | — | 59.4 | 87 |
| C2 | 86 | 0.4 | | | 84.3 | 55 |
| C3 | 76 | 3.5 | | | | |
| C4 | 87 | 42 | | 12 | 72.3 | 72 |
| C5 | 86 | 0.9 | | | 82.3 | 57 |

Discussion of Road Asphalt Results

The copolymers in Examples 1 through 5 (GMA-1, GMA-2, and GMA-3) are all polymers containing lower levels of GMA with low MI's (relatively high number average, Mn, molecular weights). As can be seen from the data in Table 3, when these copolymers are used to modify asphalt, toughness and tenacity improvements over comparative polyepoxy-polymer-linked-asphalt compositions result. It should be noted that the toughness and tenacity results in Examples 1 through 5 meet typical State DOT Specifications (110 inch-pounds for toughnesses and 75 inch-pounds for tenacities) while those in the Comparative Examples for comparable levels of copolymer in asphalt do not. In addition, when using these lower MI (higher molecular weight) copolymers to make polyepoxy-polymer-linked-asphalt compositions, the resulting polymer-modified asphalts have improved low temperature ductilities. Further, it is noted that, when using the low melt index copolymers of the present invention (even though they contain lower levels of GMA), high-temperature properties of the resulting polymer-modified asphalt are about as efficiently increased as when Comparative Example copolymers that contain twice the GMA level are used (see Example 2 versus Comparative Example C4). The ability to use polymers with less GMA significantly lowers cost.

Process for Making Roofing Asphalt in Examples

Ultramar Diamond Shamrock AC-5 asphalt was heated to a temperature of 190° C. in a can fitted with a stirrer, then the grafted linear polyethylene (see Table 4) was added and the mixture was allowed to stir for an additional hour until all the polyethylene dissolved. Then, the GMA copolymer (see Table 4) was added and the mixture was stirred and allowed to react for an additional 1 to 2 hours. Then, superphosphoric acid in the amount necessary to be equal to 0.2 wt. % of the total polymer/asphalt/acid blend was added. Stirring and reaction were continued for an additional ½ hour and the samples were poured for testing (test results are reported in Table 5).

TABLE 4

ROOFING ASPHALT

| Example | Wt. % Resin A in Asphalt | GMA Copolymer | Wt. % GMA Copolymer in Asphalt |
|---|---|---|---|
| 6 | 2 | GMA-1 | 2 |
| 7 | 2 | GMA-2 | 2 |
| Control Ex. | | | |
| C6 | 2 | Resin B | 2 |

Resin A: a linear polyethylene having 0.96 density and an MI of 2 grams/10 min., grafted with 0.9 wt. % maleic anhydride.
Resin B: Ethylene/26 wt. % nBA/1.4 wt. % GMA Copolymer with MI of 15 grams/10 min.
GMA-1 and GMA-2: Copolymers as described in Table 2

TABLE 5

ROOFING ASPHALT RESULTS

| Example | Ring and Ball Softening Point ° C. | Elastic Recovery % |
|---|---|---|
| 6 | 85.5 | 88 |
| 7 | 111 | 86 |
| C6 | 60 | 61 |

Discussion of Results in Roofing

Comparison of the results in Table 5 show that when using the lower MI (higher molecular weight) epoxy-containing copolymers of the present invention, the resulting polymer-modified asphalt has better ring and ball softening points and better elastic recovery than when the GMA copolymer of Comparative Example C6 is used.

What is claimed is:

1. A polyepoxy-polymer-linked-asphalt composition comprising
   a. about 87 to about 99 weight percent (wt. %), based on total of components a, b, and c, asphalt; and
   b. about 0.5 to about 10 wt. %, based on total of components a, b, and c, epoxy-functionalized ethylene copolymer having about 0.3 to about 5 wt. % comonomer containing a glycidyl moiety and 0 to about 40 wt. % alkyl acrylate based on the total weight of said epoxy-functionalized copolymer, wherein said epoxy-functionalized copolymer has a melt index of 4 grams/10 minutes or less measured in accord with ASTM D1238-65T, Condition E; and
   c. about 0.5 to about 3 wt. %, based on total of components a, b, and c, reactive functionalized polyolefin.

2. The polyepoxy-polymer-linked-asphalt composition of claim 1 wherein component b, epoxy-functionalized ethylene copolymer comprises about 0.5 to about 4 wt. % comonomer containing glycidyl moiety and about 25 wt. % to about 35 wt. % $C_1$ to $C_{10}$ alkyl acrylate based on the total weight of said epoxy-functionalized copolymer.

3. The polyepoxy-polymer-linked-asphalt composition of claim 1 wherein component c, reactive functionalized polyolefin, is a carboxylic acid anhydride-functionalized polyethylene.

4. The polyepoxy-polymer-linked-asphalt composition of claim 3 wherein the carboxylic acid anhydride-functionalized polyethylene is a maleic anhydride grafted polyethylene having a density of 0.94 or higher.

5. A polyepoxy-polymer-linked-asphalt composition having
   a. a tenacity of greater than 50 inch-pounds and a toughness of greater than 75 inch-pounds, measured in accord with ASTM D5801, and
   b. a low-temperature ductility of 7 centimeters or more, measured in accord with ASTM D113 at 4° C.;
   comprising the reaction product of:
   (i) about 90 to about 99.5 weight percent (wt. %), based on total of component (i) and component (ii), asphalt selected from the group consisting of native rock asphalt, lake asphalts, petroleum asphalts, airblown asphalts, cracked asphalts and residual asphalts; and
   (ii) about 0.5 to about 10 wt. %, based on total of component (i) and component (ii), epoxy-functionalized ethylene copolymer having about 0.5 to about 4 wt. % comonomer containing a glycidyl moiety and about 25 to about 35 wt. % n-butyl acrylate based on the total weight of said epoxy-functionalized ethylene copolymer, wherein said epoxy-functionalized ethylene copolymer has a melt index of 4 grams/10 minutes or less measured in accord with ASTM D1238-65T, Condition E.

6. A polyepoxy-polymer-linked-asphalt composition having
   a. an elastic recovery of greater than 70% measured in accord with ASTM D 6152, Roofing Section 7.5, and
   b. Ring and Bail Softening Points of greater than 75° C., preferably greater than 100° C. measured in accord with ASTM D3461;
   comprising the reaction product of:
   (i) about 90 to about 99.5 weight percent (wt. %), based on total of component a and component b, asphalt selected from the group consisting of native rock asphalt, lake asphalts, petroleum asphalts, airblown asphalts, cracked asphalts and residual asphalts; and
   (ii) about 0.5 to about 10 wt. %, based on total of component a and component b, epoxy-functionalized ethylene copolymer having about 0.5 to about 4 wt. % comonomer containing a glycidyl moiety and about 25 to about 35 wt. % n-butyl acrylate based on the total weight of said epoxy-functionalized ethylene copolymer, wherein said epoxy-functionalized ethylene copolymer has a melt index of 4 grams/10 minutes or less measured in accord with ASTM D1238-65T, Condition E.

7. The polyepoxy-polymer-linked-asphalt composition of claim 1 wherein the asphalt is selected from a group consisting of native rock asphalt, lake asphalts, petroleum asphalts, airblown asphalts, cracked asphalts and residual asphalts.

* * * * *

UNITED STATES PATENT AND TRADEMARK OFFICE
CERTIFICATE OF CORRECTION

PATENT NO.      : 6,743,838 B2                                              Page 1 of 1
DATED           : June 1, 2004
INVENTOR(S)     : Statz Robert Joseph and Griffin Elizabeth R.

It is certified that error appears in the above-identified patent and that said Letters Patent is hereby corrected as shown below:

Column 8,
Line 42, delete "Bail", add -- Ball --

Signed and Sealed this

Twenty-third Day of November, 2004

JON W. DUDAS
*Director of the United States Patent and Trademark Office*